United States Patent
Sikkannan Govinda Rajan et al.

(10) Patent No.: US 10,250,778 B2
(45) Date of Patent: Apr. 2, 2019

(54) DISTRIBUTED SMART CARD READER FOR MULTIFUNCTION PRINTER

(71) Applicant: Xerox Corporation, Norwalk, CT (US)

(72) Inventors: Saravanan Sikkannan Govinda Rajan, Chennai (IN); Pranesh Morris Georgian, Chennai (IN); Lavanyaa Seshadri Renganathan, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/652,546

(22) Filed: Jul. 18, 2017

(65) Prior Publication Data

US 2019/0028610 A1    Jan. 24, 2019

(51) Int. Cl.
| | |
|---|---|
| H04N 1/44 | (2006.01) |
| B42D 25/318 | (2014.01) |
| G06F 21/60 | (2013.01) |
| G06K 19/10 | (2006.01) |
| H04N 1/00 | (2006.01) |

(52) U.S. Cl.
CPC ......... *H04N 1/4426* (2013.01); *G06F 21/608* (2013.01); *G06K 19/10* (2013.01); *H04N 1/00344* (2013.01); *H04N 1/4413* (2013.01); *H04N 1/4433* (2013.01); *H04N 2201/0094* (2013.01)

(58) Field of Classification Search
USPC ...... 358/1.1–3.29; 379/93.02, 93.03, 114.19; 399/80, 108, 144
See application file for complete search history.

(56) References Cited

U.S. PATENT DOCUMENTS

| | | | |
|---|---|---|---|
| 5,721,781 A | 2/1998 | Deo et al. | |
| 6,181,436 B1 | 1/2001 | Kurachi | |
| 6,304,973 B1 * | 10/2001 | Williams | ............ H04L 63/0272 713/153 |
| 6,378,070 B1 | 4/2002 | Chan et al. | |
| 6,583,888 B1 | 6/2003 | Salgado et al. | |
| 7,526,555 B2 | 4/2009 | Shahindoust | |
| 8,844,014 B2 | 9/2014 | Hong et al. | |
| 2002/0013898 A1 * | 1/2002 | Sudia | ..................... G06Q 20/02 713/155 |

(Continued)

FOREIGN PATENT DOCUMENTS

EP    0929023 B1    6/2005

*Primary Examiner* — Marcellus J Augustin
(74) *Attorney, Agent, or Firm* — Kevin Soules; Kermit D. Lopez; Luis M. Ortiz

(57) ABSTRACT

A distributed authentication system and method comprises a smart card and a smart card reader, at least one processor; and a storage device communicatively coupled to the at least one processor, the storage device storing instructions which, when executed by the at least one processor, causes the at least one processor to perform operations comprising: receiving information that is provided to the smart card reader from the smart card, the information including authentication information, identifying at least one device where authentication is desired, storing the information on a server wherein the server is accessible by the at least one device where authentication is desired, providing the stored information to the at least one device where authentication is desired, and authenticating a user of the at least one device where authentication is desired according to the stored information.

20 Claims, 6 Drawing Sheets

(56) References Cited

U.S. PATENT DOCUMENTS

| | | | | |
|---|---|---|---|---|
| 2002/0101498 A1* | 8/2002 | Vuong | ............... | B41J 2/325 347/171 |
| 2006/0259777 A1* | 11/2006 | Izawa | ............... | B66B 1/468 713/186 |
| 2007/0187493 A1* | 8/2007 | Hong | ............... | G06Q 20/341 235/382 |
| 2014/0172161 A1* | 6/2014 | Norris | ............... | G07F 11/005 700/237 |
| 2015/0163291 A1* | 6/2015 | Fukasaka | ............... | H04L 67/10 709/201 |
| 2015/0189124 A1* | 7/2015 | Mondo | ............... | H04N 1/4426 358/1.14 |

\* cited by examiner

DISTRIBUTED SMART CARD READER FOR MULTIFUNCTION PRINTER

FIELD OF THE INVENTION

Embodiments are generally related to the field of imaging. Embodiments are also related to the field of smart cards. Embodiments are also related to methods and systems for authentication. Embodiments are further related to methods and systems for smart card authentication. Embodiments are also related to distributed smart card reader authentication for printers and other multi-function devices.

BACKGROUND

Smart cards are small, usually plastic, cards with integrated circuits. The cards are useful for personal identification, authenticating a user, and other such applications. In many large organizations, smart cards can be used for entry control, resource tracking, and other applications. Smart card technology has become increasingly popular as integrated circuitry improves, and the field of potential applications has expanded.

In most current applications, the total number of smart card readers is directly proportional to the total number of devices. That is to say, each device that requires authentication via smart card technology requires a smart card reader. If there are 10 devices in an organization, and they use smart card authentication, each device needs a separate smart card reader on it, and separately authenticates a user at the device. This is both expensive and inefficient.

Accordingly, a need in the art exists for improved systems and methods for distributed smart card readers for authentication of distributed devices such as multifunction devices as described herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for authentication.

It is another aspect of the disclosed embodiments to provide a method and system for smart card reader authentication.

It is yet another aspect of the disclosed embodiments to provide an enhanced method and system for distributed smart card reader authentication for multifunction devices.

The aforementioned aspects and other objectives and advantages can now be achieved as described herein. A distributed authentication system and method comprises a smart card and a smart card reader, at least one processor, and a storage device communicatively coupled to the at least one processor, the storage device storing instructions which, when executed by the at least one processor, causes the at least one processor to perform operations comprising: receiving information that is provided to the smart card reader from the smart card, the information including authentication information, identifying at least one device where authentication is desired, storing the information on a server wherein the server is accessible by the at least one device where authentication is desired, providing the stored information to the at least one device where authentication is desired, and authenticating a user of the at least one device where authentication is desired according to the stored information.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
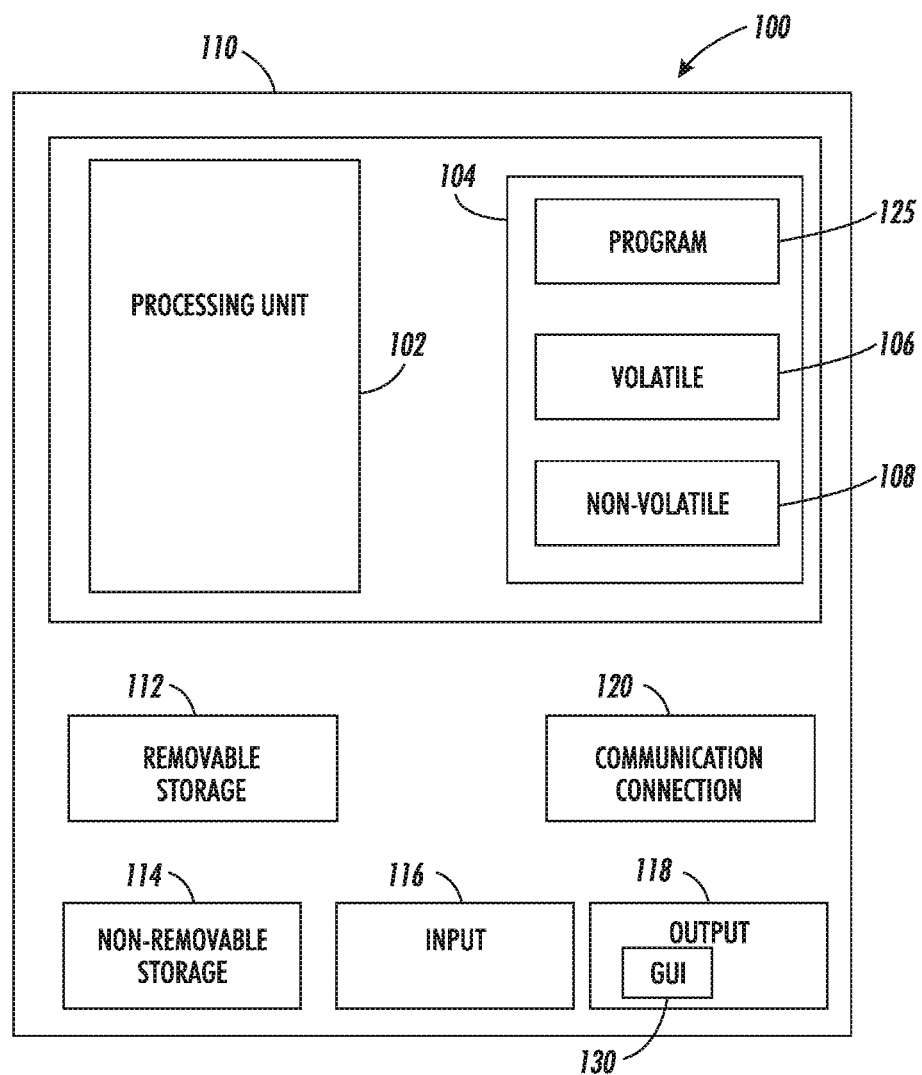
FIG. 1 depicts a block diagram of a computer system which is implemented in accordance with the disclosed embodiments.
Figure 2:
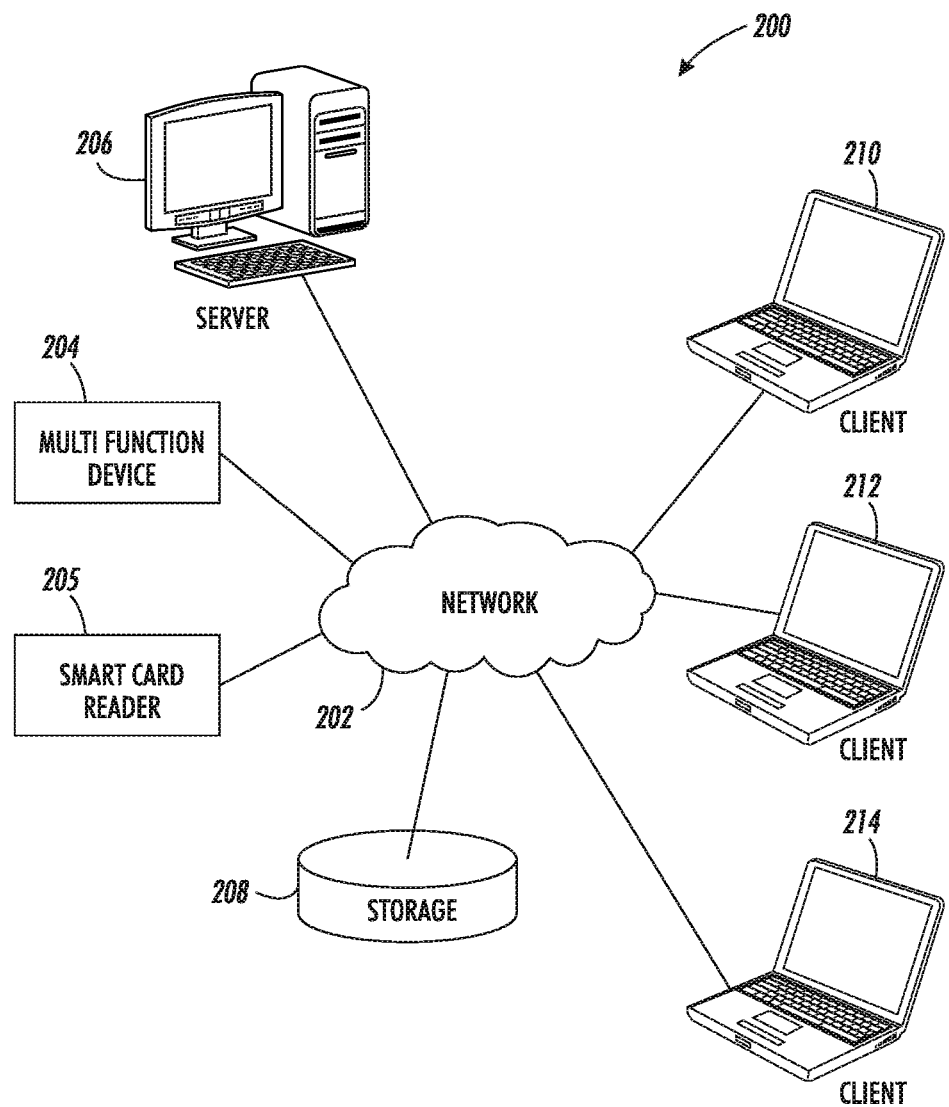
FIG. 2 depicts a graphical representation of a network of data-processing devices in which aspects of the present embodiments may be implemented.
Figure 3:
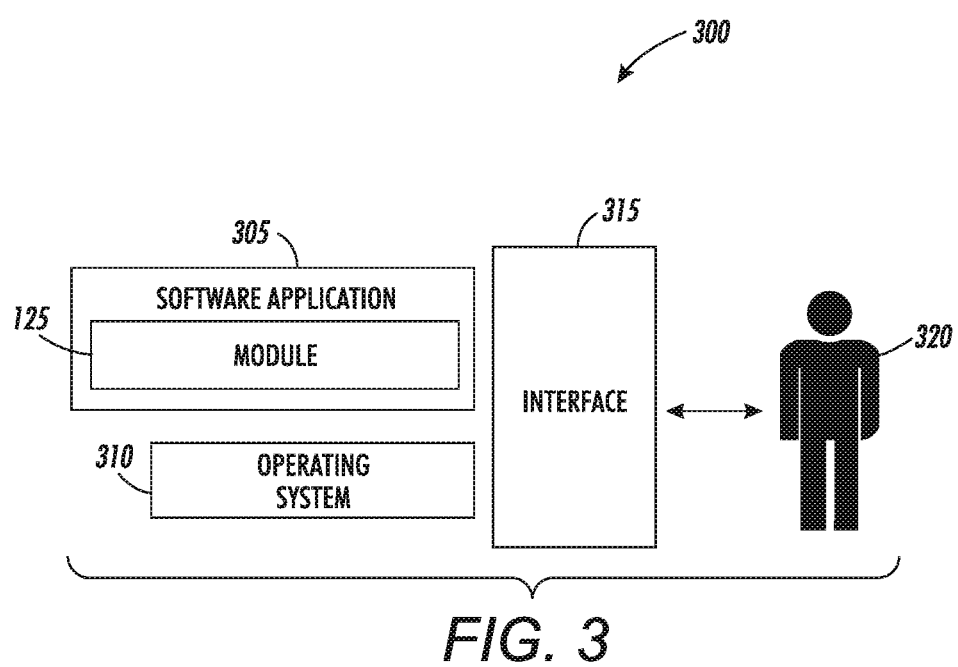
FIG. 3 depicts a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a sensor, photographic camera, video camera, tracking device, or the like. The communication connection may include a Local Area Network (LAN), a Wide Area Network (WAN), or other networks. This functionality is described in more fully in the description associated with FIG. 2 below.

Output 118 is most commonly provided as a computer monitor, but may include any computer output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as a printer, copier, scanner, fax machine, multi-function device, multi-function printer, or the like 204, a smart card reader 205, and a memory storage unit such as, for example, memory or database 208.

In the depicted example, device 204, smart card reader 205, and/or server 206 connect to network 202 along with storage unit 208. In addition, clients 210, 212, and 214 connect to network 202. These clients 210, 212, and 214 may be, for example, personal computers, network computers, or other such computing devices including mobile devices, tablet computers, etc. Computer system 100 depicted in FIG. 1 can be, for example, a client such as client 210, 212, and/or 214. Alternatively, clients 210, 212, and 214 may also be, for example, a photographic camera, video camera, tracking device, sensor, etc.

Computer system 100 can also be implemented as a server such as server 206, depending upon design considerations. In the depicted example, server 206 provides data such as boot files, operating system images, applications, and application updates to clients 210, 212, and 214, device 204, and/or smart card reader 205. Clients 210, 212, and 214 and multifunction device 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/P) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Many modern businesses rely on smart card readers to authenticate and track the use of multifunction devices. Smart card infrastructure currently requires that every device that uses smart card authentication also requires a dedicated smart card reader. However, in the embodiments disclosed herein, one smart card reader is enough for any number of devices for authentication.

In the embodiments disclosed herein a user can swipe a smart card at a particular device connected to a server. The device can authenticate the user, who can then select a device from a list of available devices for processing a job. The user is then authenticated at the selected device for a preset amount of time.

Figure 4:
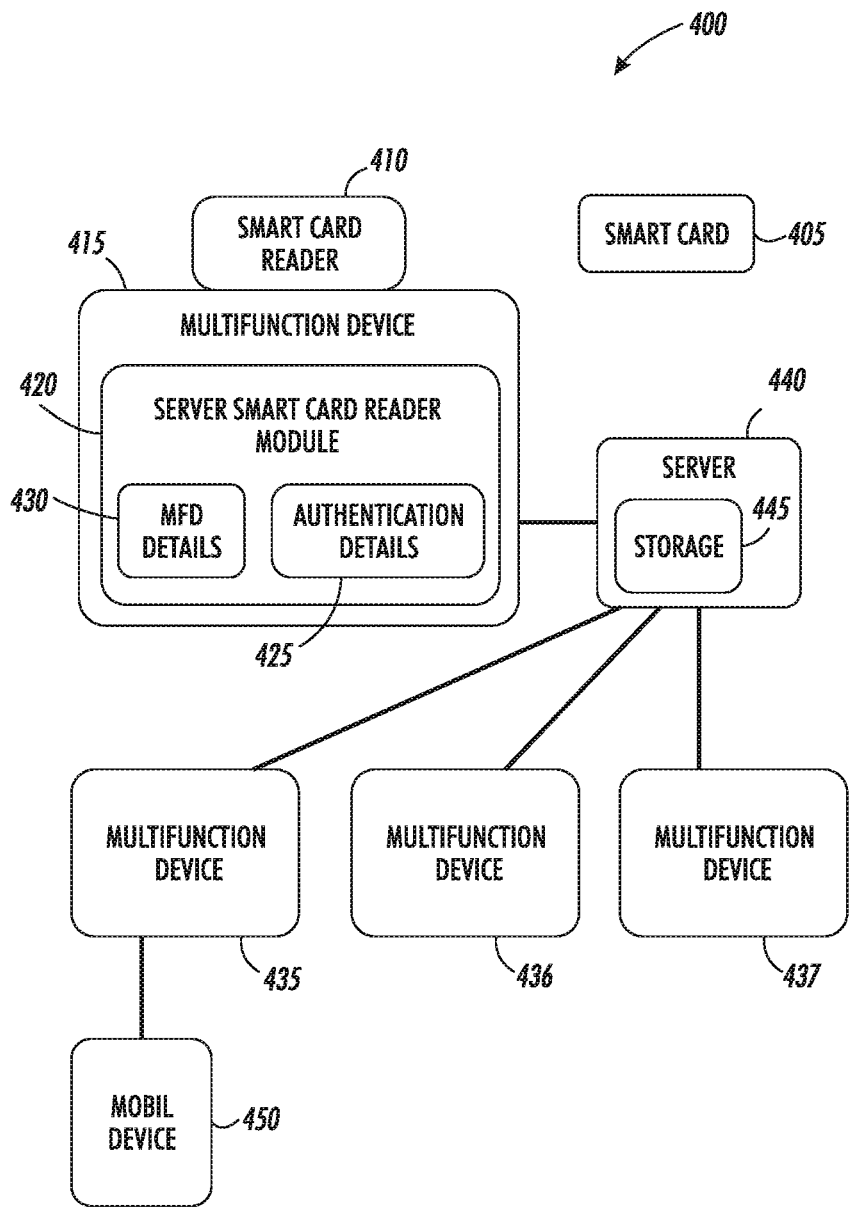
FIG. 4 depicts a block diagram of a distributed smart card reader system in accordance with the disclosed embodiments.

FIG. 4 illustrates a block diagram of a distributed smart card authentication system 400. In general, a smart card 405 can be provided to a selected group of one or more users of the system 400. Smart card 405 can be embodied as an integrated circuit card, chip card, or any other similar style card that uses integrated circuitry to communicate with a smart card reader. In various embodiments, smart card 405 can be embodied in one of two main smart card varieties, a contact smart card, or a contactless smart card.

Contact smart cards make use of contacts formed on the card, often referred to as "contact pads." The contacts provide an interface for the transmission of electrical signals with a smart card reader such as smart card reader 410, when the contact smart card is inserted into the smart card reader. Upon insertion into the smart card reader 410, the smart card 405 can communicate with the smart card reader 410, which is generally connected to, or otherwise associated with, a device, such as multifunction device 415. Contact smart cards do not carry an onboard power supply. Instead, the integrated electronics are powered via contact with the smart card reader 410, which supplies power.

In other embodiments, smart card 405 can be embodied as a contactless smart card. Contactless smart cards are configured to communicate with a smart card reader via inductive or other wireless communication. In such embodiments, the contactless smart card is moved to within a certain proximity of the smart card reader 410, which is outfitted with a communications antenna. The contactless smart card generally does not include an onboard power supply and is powered via an integrated inductor that uses the radio signal provided by the smart card reader as a source of power.

In still other embodiments, the smart card 405 can function as both a contact smart card and a contactless smart card. In such an embodiment, the smart card 405 is configured with contacts and inductive electronics that interface with the same onboard storage and processing components.

In another embodiment, the smart card and/or smart card reader can be configured to connect to a multifunction device or computer via the USB protocol and a standard USB interface. In such an embodiment, the smart card 405 and smart card reader 410 act as a system for authentication for the device with which the smart card reader is connected, and other distributed networked devices, as disclosed herein. In the embodiments disclosed herein, smart cards 405 can thus provide personnel identification, authentication, and security functionality. This is particularly valuable as for single sign-on (SSO) systems common in large organizations.

In the embodiments disclosed herein, the smart card 405 and smart card reader 410 are used for identity authentication. In some embodiments, this can include the use of a public key infrastructure (PKI). In these embodiments, the smart card 405 has on board memory that stores an encrypted digital certificate. A PKI provider can supply the digital certificate. Additional security can be achieved by employing authentication using multiple factors, which can include biometrics.

In an embodiment, the properties associated with a computer system or multifunction device 415 can be set by an administrator. To initialize the system, the administrator can enable a server smart card reader module 420 associated with an MFD 415 connected to a smart card reader 410. After the system is initialized, the administrator can enter details 430 associated with every device that can be authenticated at the MFD 415. The administrator can further set a secure password for each of the selected devices, or a single password for all the selected devices, and can define an authentication time associated with each device. In FIG. 4, the administrator-selected devices include MFD 415, MFD 435, MFD 436, and MFD 437. However, it should be understood that any number of devices, including multifunction devices, printers, fax machines, copiers, computer systems, mobile devices, servers, etc., can be included as devices that can be authenticated at the host MFD, such as MFD 415.

The MFD details 430 can include an P address for the selected devices, the serial number of the devices, the name of the devices, and the location of the devices. The details 430 can be stored in onboard memory on the MFD 415 or to a connected storage structure, such as, for example, storage 445 associated with server 440.

After the initialization has been completed, the system is ready for user authentication at various devices. In general, a user can approach MFD 415 with a smart card 405. The user can initiate the smart card reader module 420, where the user will be prompted to enter authentication details 425 including a username, password, and/or a secure pin at the MFD 415. The MFD 415 will store the authentication details 425 either in onboard storage and/or at a memory 445 associated with a server 440.

At this point, the user is prompted to swipe their smart card 405, which is read by a smart card reader 410. The smart card reader module can process authentication according to the smart card 405 information and associated authentication details 425. Once the user has been authenticated, the user can select a device such as device 435, device 436, or device 437 where the user wishes to be authenticated for job rendering. The user can identify this device via P address, machine name, and/or machine location. The serer smart card reader module 420 can send the username and pin of the user to the selected device.

The user can next go to the selected device. At the device, the user is prompted to enter the user's username and/or the user's pin. The device can authenticate the user according to the information entered. The user can be notified that authentication has been successful, at which point the user can process a job at the device.

The system can be configured to limit the time the user is authenticated at the selected device. The administrator can set this time during system initialization. If the user approaches the selected device after the expiration of the authentication time, the user will not be authenticated at the device. The device can notify the user of the expiration of the authentication time.

In some embodiments, a mobile application associated with a mobile device 450 can provide a GUI for user authentication at an MFD 435. In such embodiments, the mobile device 450 can establish a wired or wireless network connection with the MFD 435. A mobile application, associated with the mobile device 450, can then prompt the user to input authentication information such as the user's username, passcode, and/or pin. The mobile device can then transmit that information to the MFD 435, where the user can be authenticated as described above.

Figure 5:
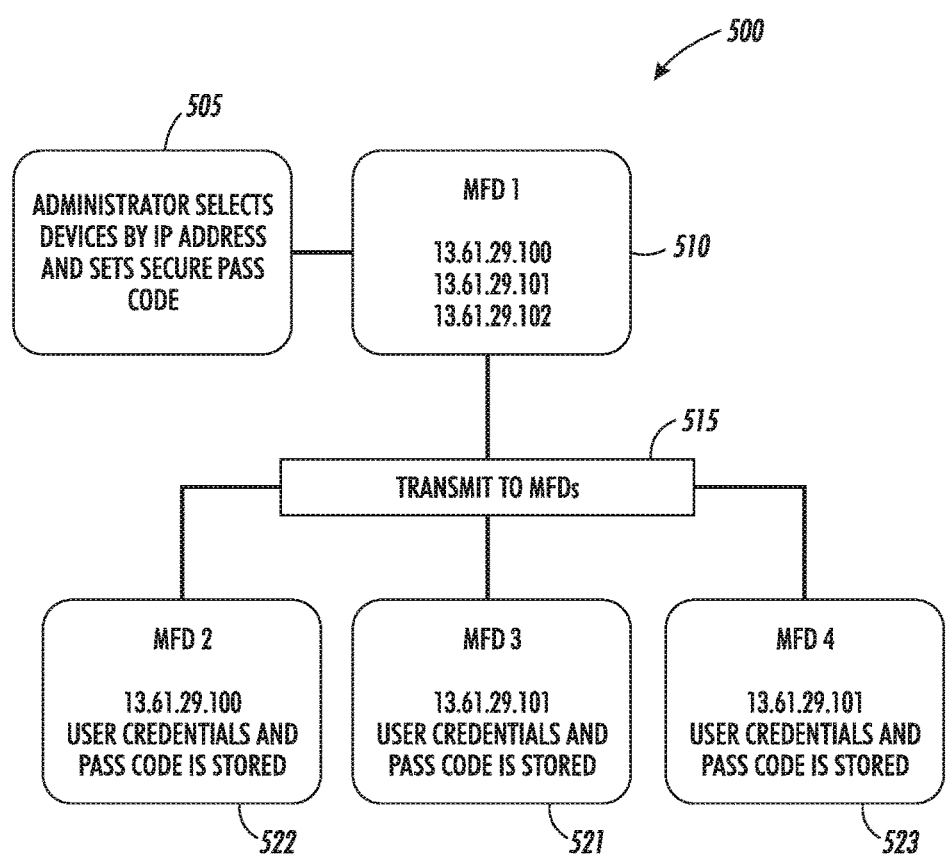
FIG. 5 depicts a flow chart illustrating steps in an initialization method in accordance with the disclosed embodiments.

FIG. 5 illustrates an example architecture associated with an initialization method 500 associated with a system for distributed smart card reader authentication. At step 505, an administrator identifies the devices that can be remotely authenticated by P address, sets one or more passcodes for authentication at the devices, and sets an authentication time. At step 510, the MFD details can be stored. Step 510 illustrates storage of a selected device and a list of P addresses associated with a number of devices.

At step 515, the MFD details can be transmitted to the selected MFD devices steps 521, 522, and 523. The transmission provides each MFD 521, 522, and 523 user credentials necessary for smart card authentication at the host device configured with the smart card reader, along with a passcode. The initialization is completed when the user credentials and passcodes have been stored on each of the authorized distributed MFDs as illustrated in FIG. 5.

Figure 6:
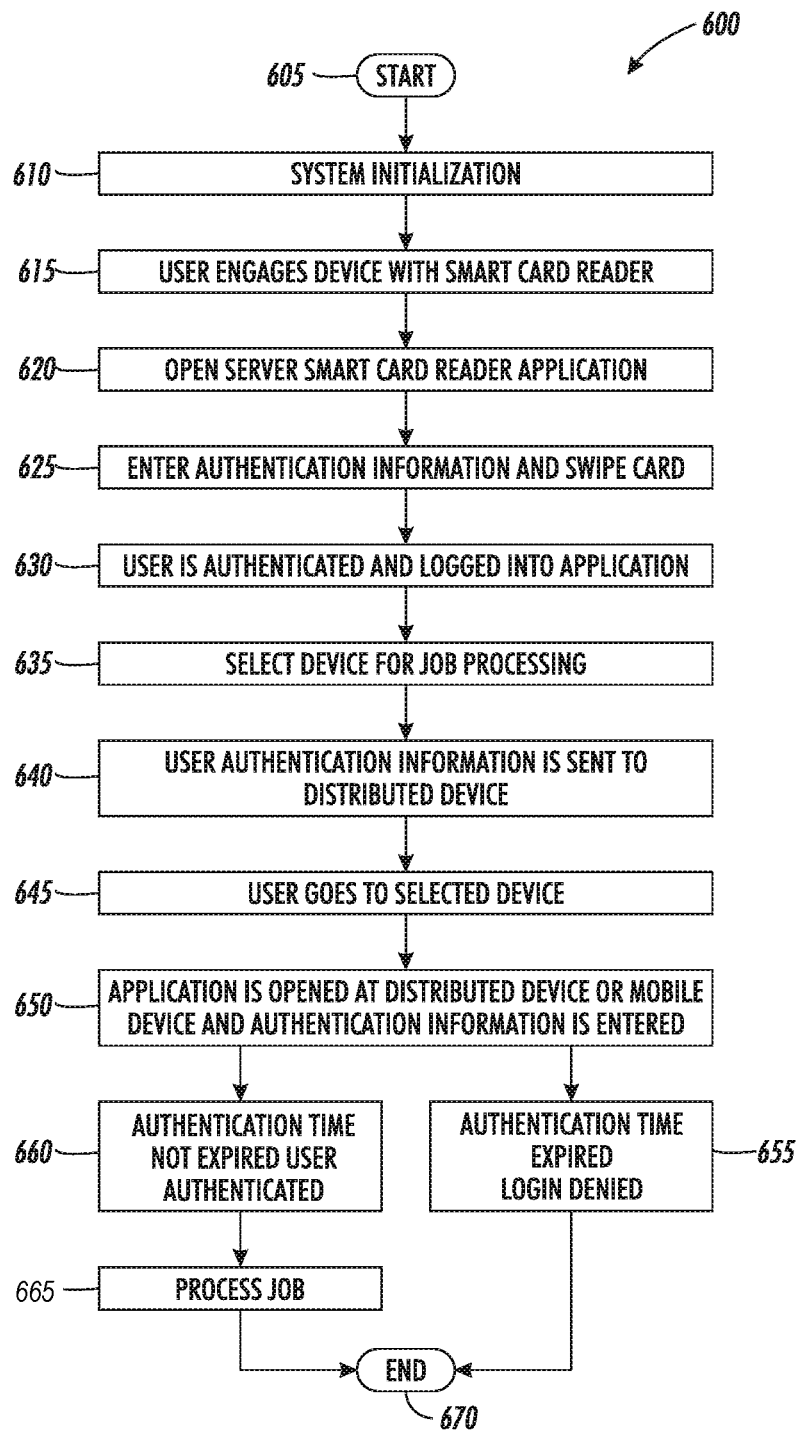
FIG. 6 depicts a flow chart of a method for distributed smart card reader authentication in accordance with disclosed embodiments.

FIG. 6 illustrates a distributed smart card authentication method 600 in accordance with the embodiments disclosed herein. The method begins at step 605. At step 610, the system can be initialized as illustrated in FIG. 5. Once initialization is complete, the system is ready for distributed authentication.

At step 615, a user can approach a multifunction device, computer system, or other such device connected to a smart card reader. At step 620, the user can select a server smart card reader application or module installed on the device. When the application launches, the user is required to enter one or more of the user's username, password, and/or secure pin. The server smart card reader application will then require the user to swipe their smart card (or otherwise establish a connection between the smart card and smart card reader) as shown at step 625. It should be appreciated that, in some embodiments, the user may be required to swipe their smart card before entering authentication information. The user authentication details and smart card information can be verified against those stored in memory on the device or server. Upon successful verification, the user will be logged in as shown at step 630.

After login, the user can be prompted to select a remote device (such as an MFD) where the user wishes to process a job, as shown at step 635. The user can select the device by IP number, device name, and/or device location. When the user selects a device, the server smart card reader application can send user details including the user's username, pin, and/or a passcode to the selected machine as shown at step 640. It should be understood that at this point, the authentication time, set by the administrator during initialization, can begin.

At this point, the user can go to the selected machine as shown at step 645. When the user is ready to process a job, the user can open a server smart card reader application at the device (or via a mobile device). The server smart card reader application will prompt the user to provide authentication information such as a username, passcode, and/or pin as shown at step 650. The server smart card reader application can check if the authentication time has expired. If it has, the user login at the device will be denied as shown at step 655. If the user authentication time has not expired, the server smart card reader application can authenticate the user at step 660 according to the authentication information, the user credentials and/or passcode previously provided to the device. Upon authentication, the user can be logged into the device and the user is allowed to process a desired job, as shown at step 665. The method then ends at step 670.

In an alternative embodiment, at step 650, a user can open a server smart card reader application on a mobile device that is connected to the selected device via a wired or wireless network connection. In this embodiment, the user authentication is processed via a mobile application on the mobile device, as opposed to a server smart card reader module installed on the MFD.

Based on the foregoing, it can be appreciated that a number of embodiments, preferred and alternative, are disclosed herein. In one embodiment, an authentication system comprises a smart card reader, at least one processor, and a storage device communicatively coupled to the at least one processor, the storage device storing instructions which, when executed by the at least one processor, causes the at least one processor to perform operations comprising: receiving information that is provided to the smart card reader from a smart card, the information including authentication information, storing the information on a server wherein the server is accessible by at least one device, providing the stored information to the at least one device upon request, and authenticating a user of the device according to the stored information. In an embodiment, the user-provided authentication data is provided to the at least one device that matches the authentication information provided to the at least one device.

In an embodiment, the device comprises at least one of a printer, a copier, a fax machine, and a multifunction device. The information specific to each of the at least one devices is provided to the server. The information specific to each of the at least one device comprises at least one of an P address, a serial number associated with the device, and a location of the device.

In an embodiment, authentication of a user of the device according to the stored information expires after a prescribed time. In an embodiment, the user-provided authentication data is transmitted to the at least one device from a portable computing device that communicates with the at least one device over at least one wireless network connection.

In another embodiment, a distributed authentication system comprises a smart card, a smart card reader, at least one processor, and a storage device communicatively coupled to the at least one processor, the storage device storing instructions which, when executed by the at least one processor, causes the at least one processor to perform operations comprising: receiving information that is provided to the smart card reader from the smart card, the information including authentication information, identifying at least one device where authentication is desired, storing the information on a server wherein the server is accessible by the at least one device where authentication is desired, providing the stored information to the at least one device where authentication is desired, and authenticating a user of the at least one device where authentication is desired according to the stored information.

In an embodiment, the at least one device where authentication is desired comprises at least one of: a printer, a copier, a fax machine, and a multifunction device.

In an embodiment, the information specific to each of the at least one devices where authentication is desired, is provided to the server, the information specific to each of the at least one devices comprising at least one of: an P address, a serial number associated with the device, and a location of the device. In an embodiment, the authentication of a user of the device according to the stored information expires after a prescribed time.

In another embodiment, user-provided authentication data that matches the authentication information is transmitted from a mobile device that communicates with the at least one device where authentication is desired over at least one wireless network connection.

In yet another embodiment, a method for distributed smart card authentication comprises reading authentication information on a smart card with a smart card reader, sending the authentication information from the smart card reader to a server, storing the authentication information on the server wherein the server is accessible by at least one device where authentication is desired, providing the stored authentication information to the at least one device where authentication is desired upon request, and authenticating a user of the at least one device where authentication is desired according to the stored authentication information.

In an embodiment, the method further comprises providing user-provided authentication data to the at least one device where authentication is desired that matches the stored authentication information provided to the at least one device where authentication is desired In an embodiment of the method, the device comprises at least one of a printer, a copier, a fax machine, and a multifunction device.

In another embodiment, the method comprises providing information specific to each of the at least one devices where authentication is desired to the server. The information specific to each of the at least one device comprises at least one of: an P address, a serial number associated with the device, and a location of the device.

In an embodiment, the method further comprises cancelling authentication at the at least one device where authentication is desired after a prescribed time.

In an embodiment, the method further comprises transmitting the user-provided authentication data to the at least one device where authentication is desired with a portable computing device over at least one wireless network connection and processing a job at the at least one device where authentication is desired after authentication of a user is complete.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An authentication system comprising:
a smart card reader;
at least one processor; and
a storage device communicatively coupled to said at least one processor, said storage device storing instructions which, when executed by said at least one processor, cause said at least one processor to perform operations comprising:
selecting, by an administrator, at least one device that can be authenticated by said smart card reader;
setting, by an administrator, a secure password for each of said at least one selected devices that can be authenticated by said smart card reader;
receiving information that is provided to said smart card reader from a smart card, said information including user authentication information;
storing said user authentication information on a server wherein said server is accessible by each of said selected devices that can be authenticated by said smart card reader;
providing said stored user authentication information to each of said selected devices upon request; and
authenticating a user of said selected device according to said stored user authentication information, and user authentication information provided at said selected device by said user.

2. The system of claim 1, wherein said user authentication information is provided to said at least one selected device that matches said user authentication information provided by said smart card reader to said at least one selected device.

3. The system of claim 1, wherein said at least one selected device comprises at least one of:
a printer;
a copier;
a fax machine; and
a multifunction device.

4. The system of claim 1, wherein information specific to each of said at least one selected devices is provided to said server.

5. The system of claim 4, wherein said information specific to each of said at least one selected devices comprises:
- an IP address;
- a serial number associated with said device; and
- a location of said device.

6. The system of claim 1, wherein said authentication of said user of said at least one selected device according to said stored user authentication information expires after a prescribed time selected by said administrator.

7. The system of claim 1, wherein said user authentication information is provided by said user to said at least one selected device from a mobile device that communicates with said at least one selected device over at least one wireless network connection.

8. A distributed authentication system comprising:
- a smart card;
- a smart card reader;
- at least one processor; and
- a storage device communicatively coupled to said at least one processor, said storage device storing instructions which, when executed by said at least one processor, cause said at least one processor to perform operations comprising:
- selecting, by an administrator, at least one device that can be authenticated by said smart card reader;
- setting, by an administrator, a secure password for each of said at least one selected devices that can be authenticated by said smart card reader;
- receiving information that is provided to said smart card reader from said smart card, said information including user authentication information;
- identifying at least one device where authentication is desired;
- storing said user authentication information on a server wherein said server is accessible by said at least one selected device that can be authenticated by said smart card reader, where authentication is desired;
- providing said stored user authentication information to each of said selected devices where authentication is desired, upon request; and
- authenticating a user of said at least one selected device where authentication is desired according to said stored user authentication information, and user authentication information provided at said selected device by said user.

9. The distributed authentication system of claim 8, wherein said at least one selected device where authentication is desired comprises at least one of:
- a printer;
- a copier;
- a fax machine; and
- a multifunction device.

10. The distributed authentication system of claim 8, wherein information specific to each of said at least one selected devices where authentication is desired, is provided to said server, said information specific to each of the at least one selected devices comprising:
- an IP address;
- a serial number associated with said device; and
- a location of said device.

11. The distributed authentication system of claim 8, wherein said authentication of said user of said at least one selected device according to said stored user authentication information expires after a prescribed time selected by said administrator.

12. The distributed authentication system of claim 8, wherein said user authentication information is provided by said user to said at least one selected device from a mobile device that communicates with the at least one selected device where authentication is desired over at least one wireless network connection.

13. A method for distributed smart card authentication comprising:
- selecting, by an administrator, at least one device that can be authenticated by said smart card reader;
- setting, by an administrator, a secure password for each of said at least one selected devices that can be authenticated by said smart card reader;
- reading user authentication information on a smart card with a smart card reader;
- sending said user authentication information from said smart card reader to a server;
- storing said user authentication information on said server wherein said server is accessible by each of said selected devices that can be authenticated by said smart card reader;
- providing said stored user authentication information to each of said selected devices where authentication is desired upon request; and
- authenticating a user of said at least one selected device where authentication is desired according to said stored user authentication information, and user authentication information provided at said selected device by said user.

14. The method of claim 13 further comprising:
providing user-provided authentication data to said at least one selected device where authentication is desired that matches said stored authentication information provided to said at least one selected device where authentication is desired.

15. The method of claim 14 further comprising:
transmitting said user authentication information provided by said user to said at least one selected device where authentication is desired with a mobile device over at least one wireless network connection.

16. The method of claim 13, wherein said at least one selected device comprises at least one of:
- a printer;
- a copier;
- a fax machine; and
- a multifunction device.

17. The method of claim 13 further comprising:
providing information specific to each of said at least selected one devices where authentication is desired to said server.

18. The method of claim 17, wherein said information specific to each of said at least one selected devices comprises:
- an IP address;
- a serial number associated with said device; and
- a location of said device.

19. The method of claim 13 further comprising:
cancelling authentication at said at least one selected device where authentication is desired after a prescribed time selected by an administrator.

20. The method of claim 13 further comprising:
processing a job at said at least one selected device where authentication is desired after authentication of a user is complete.

* * * * *